US011600047B2

United States Patent
Guay et al.

(10) Patent No.: US 11,600,047 B2
(45) Date of Patent: Mar. 7, 2023

(54) AUTOMATED IMAGE AUGMENTATION USING A VIRTUAL CHARACTER

(71) Applicants: Disney Enterprises, Inc., Burbank, CA (US); ETH Zurich, Zurich (CH)

(72) Inventors: Martin Guay, Zurich (CH); Gokcen Cimen, Zurich (CH); Christoph Maurhofer, Hinwil (CH); Mattia Ryffel, Bern (CH); Robert Sumner, Zurich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 366 days.

(21) Appl. No.: 16/037,745

(22) Filed: Jul. 17, 2018

(65) Prior Publication Data
US 2020/0027271 A1  Jan. 23, 2020

(51) Int. Cl.
*G06T 7/73* (2017.01)
*G06T 19/00* (2011.01)

(52) U.S. Cl.
CPC .............. *G06T 19/006* (2013.01); *G06T 7/73* (2017.01); *G06T 2207/30196* (2013.01)

(58) Field of Classification Search
CPC  G06T 19/006; G06T 7/73; G06T 2207/30196
USPC ......................................................... 345/419
See application file for complete search history.

(56) References Cited

U.S. PATENT DOCUMENTS

| 2010/0303289 | A1* | 12/2010 | Polzin | G06K 9/00342 382/103 |
| 2011/0249865 | A1* | 10/2011 | Lee | G06K 9/00362 382/103 |
| 2013/0093788 | A1* | 4/2013 | Liu | G06F 3/011 345/633 |
| 2013/0142390 | A1* | 6/2013 | Othmezouri | G06K 9/00362 382/103 |

(Continued)

OTHER PUBLICATIONS

Federica Bogo, Angjoo Kanazawa, Christoph Lassner, Peter Gehler, Javier Romero, and Michael J. Black. 2016. Keep it SMPL: Automatic Estimation of 3D Human Pose and Shape from a Single Image. In European Conference on Computer Vision (ECCV).*

(Continued)

*Primary Examiner* — Jin Ge
(74) *Attorney, Agent, or Firm* — Farjami & Farjami LLP (57) ABSTRACT

An image processing system includes a computing platform having a hardware processor and a system memory storing an image augmentation software code, a three-dimensional (3D) shapes library, and/or a 3D poses library. The image processing system also includes a two-dimensional (2D) pose estimation module communicatively coupled to the image augmentation software code. The hardware processor executes the image augmentation software code to provide an image to the 2D pose estimation module and to receive a 2D pose data generated by the 2D pose estimation module based on the image. The image augmentation software code identifies a 3D shape and/or a 3D pose corresponding to the image using an optimization algorithm applied to the 2D (Continued)

pose data and one or both of the 3D poses library and the 3D shapes library, and may output the 3D shape and/or 3D pose to render an augmented image on a display.

20 Claims, 7 Drawing Sheets

(56) References Cited

U.S. PATENT DOCUMENTS

| | | | | |
|---|---|---|---|---|
| 2013/0250050 | A1* | 9/2013 | Kanaujia | H04N 7/181 348/42 |
| 2013/0271458 | A1* | 10/2013 | Andriluka | G06K 9/00342 345/420 |
| 2014/0219550 | A1* | 8/2014 | Popa | G06K 9/00342 382/154 |
| 2015/0356767 | A1* | 12/2015 | Suma | G06T 15/005 345/419 |
| 2016/0198097 | A1* | 7/2016 | Yewdall | H04N 5/265 348/659 |
| 2016/0371829 | A1* | 12/2016 | Yamaguchi | G06T 7/70 |
| 2017/0011556 | A1* | 1/2017 | Hayashi | G06T 19/20 |
| 2017/0316578 | A1* | 11/2017 | Fua | G06T 7/73 |
| 2017/0323488 | A1* | 11/2017 | Mott | G06F 3/002 |
| 2018/0181802 | A1* | 6/2018 | Chen | G06K 9/00201 |
| 2018/0211399 | A1* | 7/2018 | Lee | G06T 7/529 |
| 2019/0164346 | A1* | 5/2019 | Kim | G06T 15/005 |
| 2019/0371080 | A1* | 12/2019 | Sminchisescu | G06T 19/20 |

OTHER PUBLICATIONS

Rogge, L., Neumann, et al. "Monocular Pose Reconstruction for an Augmented Reality Clothing System." *In Proc. Vision, Modeling and Visualization (VMV), Eurographics*, 2011. pp. 339-346.

Rogge, L., Klose, et al. "Garment Replacement in Monocular Video Sequences." *ACM Trans. Graph.* 34, Dec. 1, 2014. pp. 6:1-6:10.

Zund, F., Lancelle, et al. "Influence of Animated Reality Mixing Techniques on User Experience." *In Proceedings of the Seventh International Conference on Motion in Games, ACM, MIG '14*, 2014. pp. 125-132.

McIntosh, K., Mars, et al. "Magic bench: A Multi-User, Multi-Sensory AR/MR Platform." *In ACM SIGGRAPH, VR Village*, 2017. pp. 1-2.

Shotton, J., et al. "Real-Time Human Pose Recognition in Parts from Single Depth Images." *Springer Berlin Heidelberg*, Berlin, Heidelberg, 2013. pp. 119-135.

Cimen, G., Yuan, et al. "Interacting with Intelligent Characters in AR." *International SERIES on Information Systems and Management in Creative eMedia (CreMedia)*, Feb. 2017. pp. 24-29.

Haggag, H., et al. "An Adaptable System for RGB-D based Human Body Detection and Pose Estimation: Incorporating Attached Props." *IEEE International Conference on Systems, Man, and Cybernetics*, 2016. pp. 1-6.

Zimmermann, C., et al. "3d Human Pose Estimation in RGBD Images for Robotic Task Learning." *CoRR* abs/1803.02622, 2018. pp. 1-7.

Mehta, D., et al. "Monocular 3d Human Pose Estimation in the Wild Using Improved CNN Supervision." *In 2017 Fifth International Conference on 3D Vision (3DV)*, 2017. pp. 1-16.

Martinez, J., et al. "A Simple Yet Effective Baseline for 3d Human Pose Estimation." *CoRR* abs/1705.03098, 2017. pp. 1-10.

Mehta, D., et al. "Vnect: Real-Time 3d Human Pose Estimation with a Single RGB Camera." *ACM Trans. Graph.* 36, 2017. pp. 44:1-44:14.

Wang, C., et al. "Robust Estimation of 3d Human Poses from a Single Image." *CoRR* abs/1406.2282, 2014. pp. 4321-4329.

Yasin, H., et al. "3d Pose Estimation from a Single Monocular Image." *CoRR* abs/1509.06720, 2015. pp. 1-13.

Chen, C., et al. "3d Human Pose Estimation = 2d Pose Estimation + Matching." *CoRR* abs/1612.06524, 2016. pp. 1-9.

* cited by examiner

AUTOMATED IMAGE AUGMENTATION USING A VIRTUAL CHARACTER

BACKGROUND

Augmented reality (AR), in which real world objects and/or environments are digitally augmented with virtual imagery, offers more immersive and enjoyable educational or entertainment experiences.

SUMMARY

There are provided systems and methods for performing automated image augmentation using a virtual character, substantially as shown in and/or described in connection with at least one of the figures, and as set forth more completely in the claims.

DETAILED DESCRIPTION

Despite its usefulness in augmenting many inanimate objects, however, digital augmentation of the human body continues to present significant technical challenges. For example, due to the ambiguities associated with depth projection, as well as the variations in human body shapes, three-dimensional (3D) human pose estimation from a red-green-blue (RGB) image is an under-constrained and ambiguous problem.

Although solutions for estimating a human pose using a depth camera have been proposed, they typically require the preliminary generation of a large data set of 3D skeleton poses and depth image pairs. A machine learning model is then trained to map depth to 3D skeletons. In addition to the pre-processing burdens imposed by such approaches, there are the additional disadvantages that a large data set of 3D skeleton poses can be complicated to gather, as well as the possibility that those data sets may not include all of the poses that are useful or relevant to a particular application.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
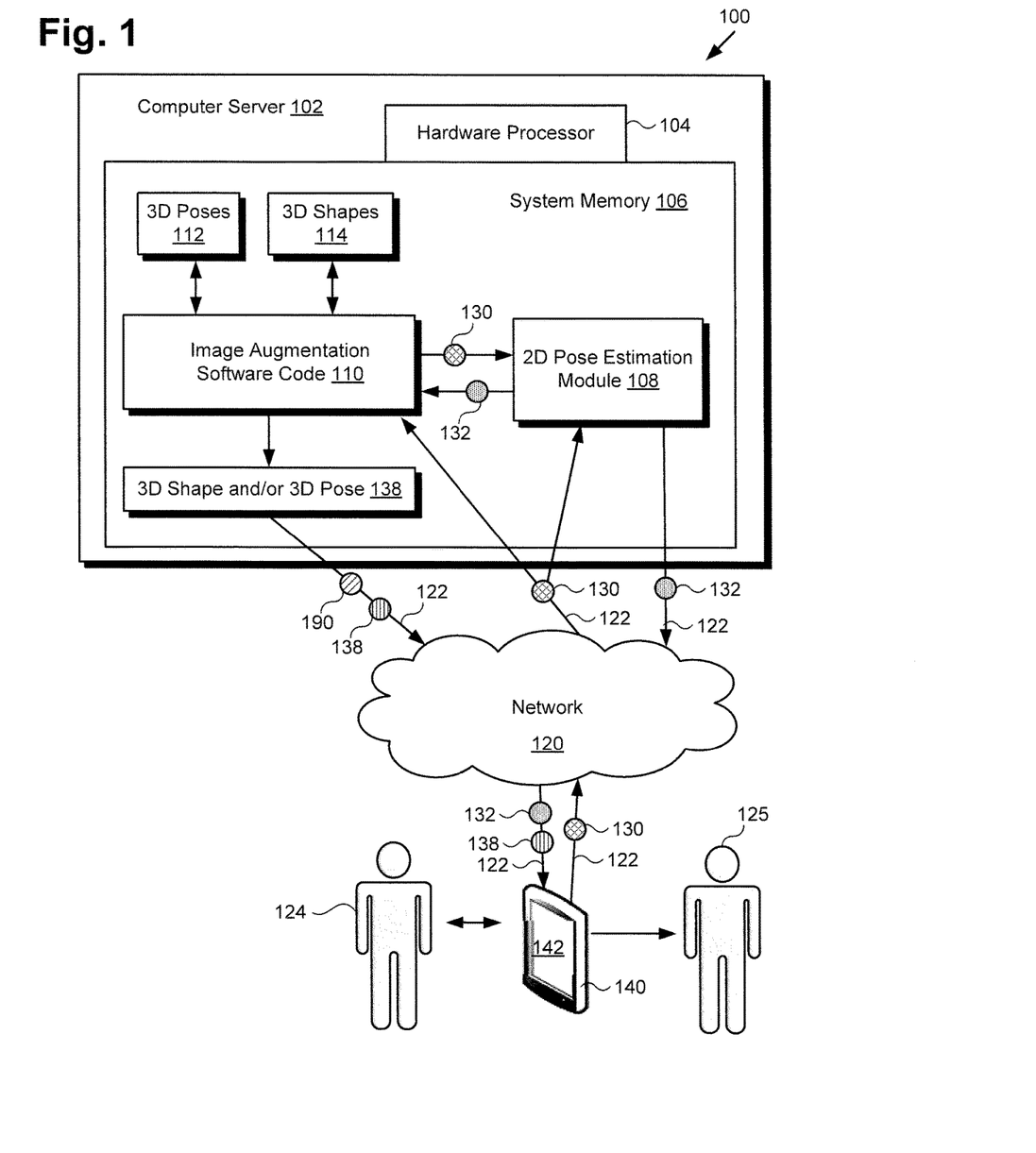
FIG. 1 shows a diagram of an exemplary system for performing automated image augmentation, according to one implementation.

FIG. 1 shows a diagram of an exemplary system for performing automated image augmentation. As shown in FIG. 1, image processing system 100 includes computer server 102 having hardware processor 104, and system memory 106 implemented as a non-transitory storage device. According to the present exemplary implementation, system memory 106 stores image augmentation software code 110, one or both of 3D poses library 112 and 3D shapes library 114, and 2D pose estimation module 108.

As further shown in FIG. 1, computer server 102 is implemented within a use environment including network 120, communication device 140 remote from computer server 102 (hereinafter "remote communication device 140") including display 142, first user 124 (hereinafter "user 124") utilizing remote communication device 140, and second user or subject 125 (hereinafter "subject 125"). Also shown in FIG. 1 are network communication links 122 communicatively coupling remote communication device 140 to computer server 102 via network 120, image 130, and 2D pose data 132 generated by 2D pose estimation module 108, as well as augmented image 190 or 3D shape and/or 3D pose 138 output by image augmentation software code 110.

It is noted that, although the present application refers to image augmentation software code 110, one or both of 3D poses library 112 and 3D shapes library 114, and 2D pose estimation module 108 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computer server 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts image augmentation software code 110, one or both of 3D poses library 112 and 3D shapes library 114, and 2D pose estimation module 108 as being co-located in system memory 106, that representation is also provided merely as an aid to conceptual clarity. More generally, image processing system 100 may include one or more computing platforms corresponding to computer server 102 and/or remote communication device 140, which may be co-located, or may form an interactively linked but distributed system, such as a cloud based system, for instance.

As a result, hardware processor 104 and system memory 106 may correspond to distributed processor and memory resources within image processing system 100. Thus, it is to be understood that image augmentation software code 110, one or both of 3D poses library 112 and 3D shapes library 114, and 2D pose estimation module 108 may be stored and/or executed using the distributed memory and/or processor resources of image processing system 100.

Image processing system 100 provides an automated image processing solution for augmenting an image portraying a human being, with a virtual character. Image processing system 100 does so at least in part by providing the image as an input to a two-dimensional (2D) pose estimation module and receiving a 2D pose data generated by the 2D pose estimation module based on the image. Image processing system 100 further identifies one or more of a three-dimensional (3D) pose and a 3D shape corresponding to the human portrayal (hereinafter "human image") based on the 2D pose data. The identified 3D shape and/or 3D pose can then be used to size and/or pose a virtual character for inclusion in an augmented image including the human image and/or the virtual character.

In one implementation of image processing system 100, the virtual character may appear in the augmented image beside the human image, and may assume a posture or pose that substantially reproduces the pose of the human image. In another implementation, the virtual character may partially overlap the human image, such as by appearing to have an arm encircling the shoulders or waist of the human image, for example. In yet another implementation, the virtual character may substantially overlap and obscure the human image so as to appear to be worn as a costume by the human image. As a result, image processing system 100 advantageously provides a fully automated solution for generating augmented self-images, such as so called "selfies," or other images for a user.

For example, in some implementations, user 124 may utilize remote communication device 140 to obtain a selfie, which may be augmented by image processing system 100. Alternatively, or in addition, user 124 may utilize remote communication device 140 to obtain an image of another person, such as subject 125, which may be augmented by image processing system 100. These implementations and more are discussed in more detail below.

Turning to the implementation shown in FIG. 1, user 124 may utilize remote communication device 140 to interact with computer server 102 over network 120. In one such implementation, computer server 102 may correspond to one or more web servers, accessible over a packet-switched network such as the Internet, for example. Alternatively, computer server 102 may correspond to one or more computer servers supporting a local area network (LAN), or included in another type of limited distribution network.

Although remote communication device 140 is shown as a mobile device in the form of a smartphone or tablet computer in FIG. 1, that representation is also provided merely as an example. More generally, remote communication device 140 may be any suitable mobile or stationary computing device or system remote from computer server 102 and capable of performing data processing sufficient to provide a user interface, support connections to network 120, and implement the functionality ascribed to remote communication device 140 herein. For example, in other implementations, remote communication device 140 may take the form of a laptop computer, or a photo booth in a theme park or other entertainment venue, for example. In one implementation, user 124 may utilize remote communication device 140 to interact with computer server 102 to use image augmentation software code 110, executed by hardware processor 104, to produce 3D shape and/or 3D pose 138 for augmenting image 130.

It is noted that, in various implementations, 3D shape and/or 3D pose 138, when generated using image augmentation software code 110, may be stored in system memory 106 and/or may be copied to non-volatile storage. Alternatively, or in addition, as shown in FIG. 1, 3D shape and/or 3D pose 138 may be sent to remote communication device 140 including display 142, for example by being transferred via network communication links 122 of network 120. It is further noted that display 142 may be implemented as a liquid crystal display (LCD), a light-emitting diode (LED) display, an organic light-emitting diode (OLED) display, or any other suitable display screen that performs a physical transformation of signals to light.

Figure 2:
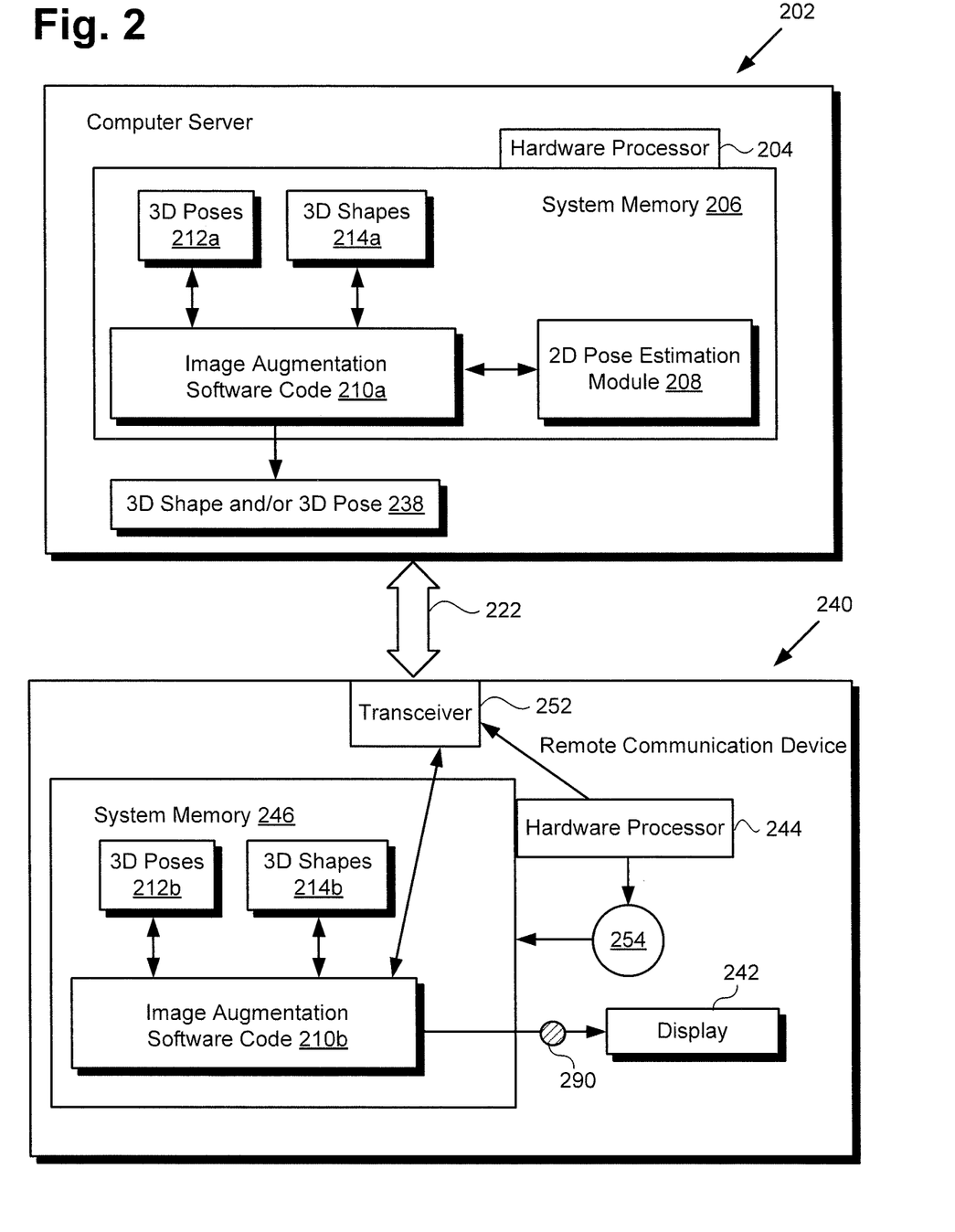
FIG. 2 shows a more detailed exemplary representation of a remote communication device suitable for use in performing automated image augmentation, in combination with a computer server.

FIG. 2 shows a more detailed representation of exemplary remote communication device 240 in combination with computer server 202. As shown in FIG. 2, remote communication device 240 is communicatively coupled to computer server 202 over network communication link 222. Computer server 202 includes hardware processor 204, and system memory 206 storing image augmentation software code 210a, one or both of 3D poses library 212a and 3D shapes library 214a, and 2D pose estimation module 208.

As further shown in FIG. 2, remote communication device 240 includes hardware processor 244, system memory 246 implemented as a non-transitory storage device storing image augmentation software code 210b and one or both of 3D poses library 212b and 3D shapes library 214b. As also shown in FIG. 2, remote communication device 240 includes transceiver 252, camera 254, and display 242 receiving augmented image 290 from image augmentation software code 210b.

Network communication link 222 and computer server 202 having hardware processor 204 and system memory 206, correspond in general to network communication link 122 and computer server 102 having hardware processor 104 and system memory 106, in FIG. 1. In addition, image augmentation software code 210a, 3D poses library 212a, 3D shapes library 214a, and 2D pose estimation module 208, in FIG. 2, correspond respectively in general to image augmentation software code 110, 3D poses library 112, 3D shapes library 114, and 2D pose estimation module 108, in FIG. 1. In other words, image augmentation software code 210a, 3D poses library 212a, 3D shapes library 214a, and 2D pose estimation module 208 may share any of the characteristics attributed to respectively corresponding image augmentation software code 110, 3D poses library 112, 3D shapes library 114, and 2D pose estimation module 108 by the present disclosure, and vice versa. It is also noted that augmented image 290 and 3D shape and/or 3D pose 238, in FIG. 2, correspond respectively in general to augmented image 190 and 3D shape and/or 3D pose 138, in FIG. 1.

Remote communication device 240 and display 242 correspond in general to remote communication device 140 and display 142, in FIG. 1, and those corresponding features may share any of the characteristics attributed to either corresponding feature by the present disclosure. Thus, like remote communication device 140, remote communication device 240 may take the form of a smartphone, tablet or laptop computer, or a photo booth in a theme park or other entertainment venue. In addition, and although not shown in FIG. 1, remote communication device 140 may include features corresponding to hardware processor 244, transceiver 252, camera 254, and system memory 246 storing image augmentation software code 210b and one or both of 3D poses library 212b and 3D shapes library 214b. Moreover, like display 142, display 242 may be implemented as an LCD, an LED display, an OLED display, or any other suitable display screen that performs a physical transformation of signals to light.

With respect to image augmentation software code 210b, 3D poses library 212b, and 3D shapes library 214b, it is noted that in some implementations, image augmentation software code 210b may be an application providing a user interface for exchanging data, such as data corresponding to image 130 and augmented image 190/290 or 3D shape and/or 3D pose 138/238 with computer server 102/202. In those implementations, system memory 246 of remote communication device 140/240 may not store 3D poses library 212b or 3D shapes library 214b.

However, in other implementations, image augmentation software code 210b may include all of the features of image augmentation software code 110/210a, and may be capable of executing all of the same functionality. That is to say, in some implementations, image augmentation software code 210b corresponds to image augmentation software code 110/210a and may share any of the features and perform any of the processes attributed to those corresponding features by the present disclosure.

Furthermore, and as shown in FIG. 2, in implementations in which image augmentation software code 210b corresponds to image augmentation software code 110/210a, one or both of 3D poses library 212b and 3D shapes library 214b may be stored locally on system memory 246. It is also noted that, when present in system memory 246 of remote communication device 240, 3D poses library 212b and 3D shapes library 214b correspond respectively in general to 3D poses library 112/212a and 3D shapes library 114/214b, and may share any of the characteristics attributed to those corresponding features by the present disclosure.

According to the exemplary implementation shown in FIG. 2, image augmentation software code 210b and one or both of 3D poses library 212b and 3D shapes library 214b are located in system memory 246, having been received via network communication link 122/222, either from computer server 102/202 or an authorized third party source of image augmentation software code 210b and one or both of 3D poses library 212b and 3D shapes library 214b. In one implementation, network communication link 122/222 corresponds to transfer of image augmentation software code 210b and one or both of 3D poses library 212b and 3D shapes library 214b over a packet-switched network, for example. Once transferred, for instance by being downloaded over network communication link 122/222, image augmentation software code 210b and one or both of 3D poses library 212b and 3D shapes library 214b may be persistently stored in device memory 246, and image augmentation software code 210b may be executed on remote communication device 140/240 by hardware processor 244.

Hardware processor 244 may be the central processing unit (CPU) for remote communication device 140/240, for example, in which role hardware processor 244 runs the operating system for remote communication device 140/240 and executes image augmentation software code 210b. As noted above, in some implementations, remote communication device 140/240 can utilize image augmentation software code 210b as a user interface with computer server 102/202 for providing image 130 to image augmentation software code 110/210a, and for receiving augmented image 190/290 or 3D shape and/or 3D pose 138/238 from image augmentation software code 110/210a.

However, in other implementations, remote communication device 140/240 can utilize image augmentation software code 210b to interact with computer server 102/202 by providing image 130 to 2D pose estimation module 108/208, and may receive 2D pose data 132 generated by 2D pose estimation module 108/208 via network 120. In those latter implementations, image augmentation software code 210b may further identify 3D shape and/or 3D pose 138/238 on remote communication device 140/240, and may use 3D shape and/or 3D pose 138/238 to produce augmented image 190/290. Furthermore, in those implementations, hardware processor 244 may execute image augmentation software code 210b to render augmented image 190/290 on display 142/242.

Figure 3:
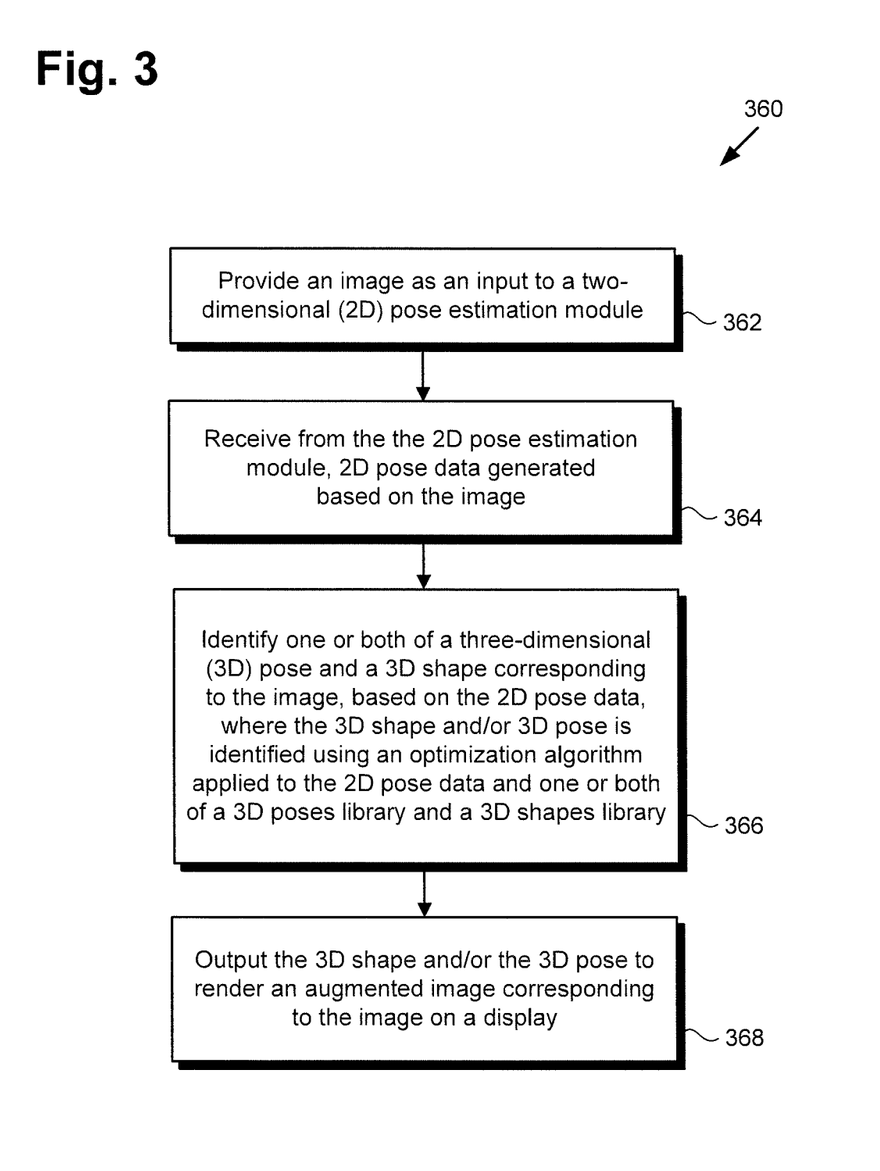
FIG. 3 shows a flowchart presenting an exemplary method for performing automated image augmentation, according to one implementation.

The functionality of image processing system 100 will be further described by reference to FIG. 3. FIG. 3 shows flowchart 360 presenting an exemplary method for performing automated image augmentation, according to one implementation. With respect to the method outlined in FIG. 3, it is noted that certain details and features have been left out of flowchart 360 in order not to obscure the discussion of the inventive features in the present application. It is further noted that the feature "computer server 102/202" described in detail above will hereinafter be referred to as "computing platform 102/202," while the feature "remote communication device 140/240" will hereinafter be referred to as "remote computing platform 140/240."

Referring to FIG. 3 in combination with FIGS. 1 and 2, flowchart 360 begins with providing image 130 as an input to 2D pose estimation module 108/208 (action 362). Image 130 may be a red-green-blue (RGB) image obtained by a digital camera, such as a digital still image camera for example. Alternatively, image 130 may be an RGB image taken from a video clip obtained by a digital video camera. In one implementation, image 130 may be a single monocular image including a human image portraying a human body in a particular posture or pose, for example.

In some implementations, hardware processor 244 of remote computing platform 140/240 may execute image augmentation software code 210b to obtain image 130 using camera 254. Thus, camera 254 may be an RGB camera configured to obtain still or video digital images.

In some implementations, image 130 may be transmitted by remote computing platform 140/240, using transceiver 252, to computing platform 102/202 via network 120 and network communication links 122/222. In those implementations, image 130 may be received by image augmentation software code 110/210a, executed by hardware processor 104/204 of computing platform 102/202. However, in other implementations, image 130 may be received from camera 254 by image augmentation software code 210b, executed by hardware processor 244 of remote computing platform 140/240.

In implementations in which image 130 is received by image augmentation software code 110/210a stored in system memory 106/206 also storing 2D pose estimation module 108/208, providing image 130 in action 362 may be performed as a local data transfer within system memory 106/206 of computing platform 102/202, as shown in FIG. 1. In those implementations, image 130 may be provided to 2D pose estimation module 108/208 by image augmentation software code 110/210a, executed by hardware processor 104/204 of computing platform 102/202.

However, as noted above, in some implementations, image 130 is received by image augmentation software code 210b stored in system memory 246 of remote computing platform 140/240. In those implementations, remote computing platform is remote from 2D pose estimation module 108/208. Nevertheless, and as shown by FIG. 1, 2D pose estimation module 108/208 may be communicatively coupled to image augmentation software code 210b via network 120 and network communication links 122/222. In those implementations, image 130 may be provided to 2D pose estimation module 108/208 via network 120 by image augmentation software code 210b, executed by hardware processor 244 of remote computing platform 140/240, and using transceiver 252.

Flowchart 360 continues with receiving from 2D pose estimation module 108/208, 2D pose data 132 generated based on image 130 (action 364). 2D pose estimation module 108/208 may be configured to run a deep neural network, as known in the art, which takes image 130 as input, and returns 2D pose data 132 as a list of joint positions $y_i$ together with a confidence value $c_i$ for each joint position $y_i$. For example, when image 130 includes an image of a partially visible human body, a low confidence value will result for joints outside of view. The deep neural network of 2D pose estimation module 108/208 may have been previously trained over a large data set of hand annotated images, for example, but may be implemented so as to generate pose data 132 based on image 130 in an automated process.

Figure 4:
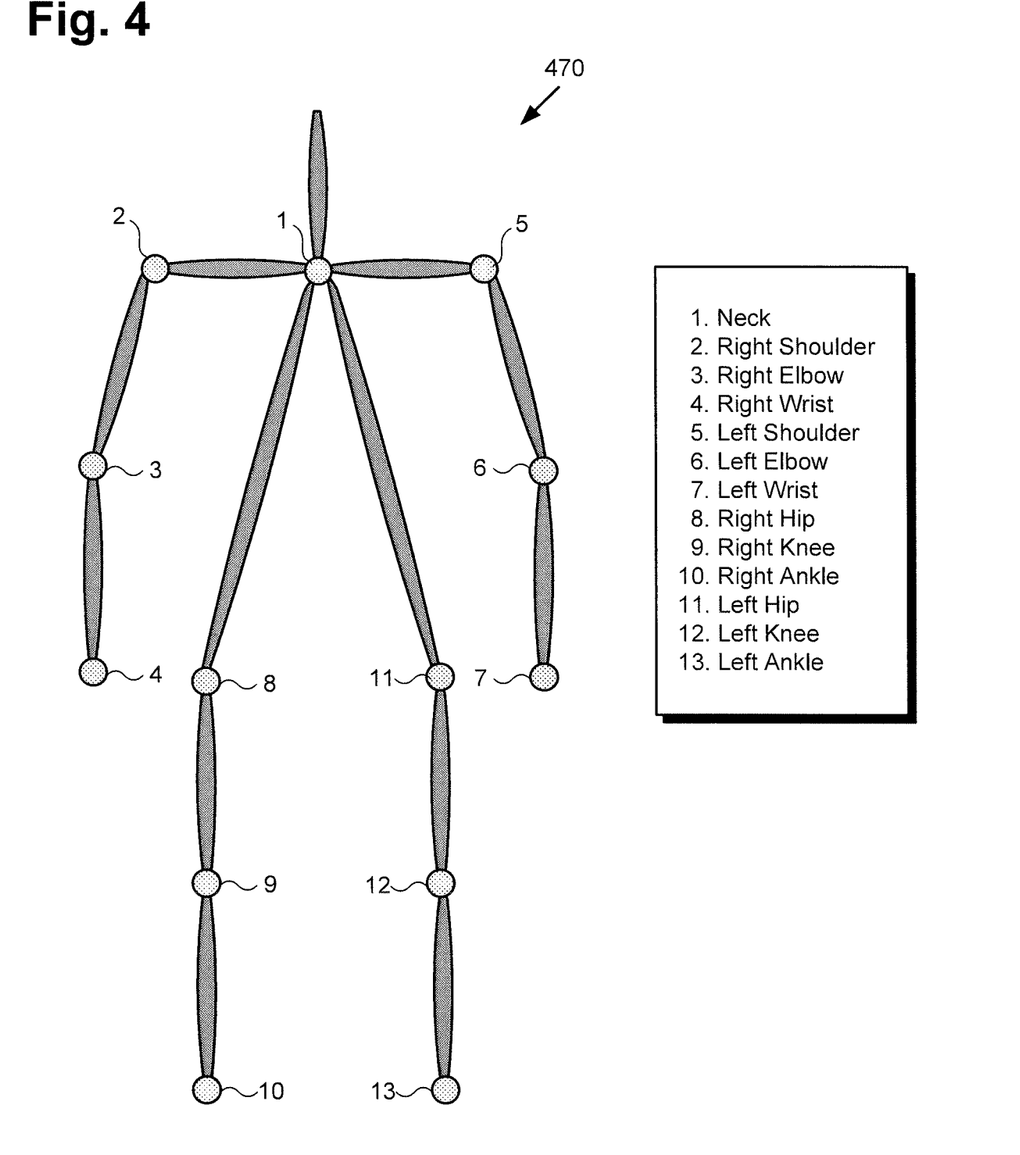
FIG. 4 shows an exemplary two-dimensional (2D) skeleton suitable for use in performing image augmentation using a virtual character, according to one implementation.

Referring to FIG. 4, FIG. 4 shows 2D skeleton 470 described by 2D pose data 132 generated based on a human image included in image 130. 2D skeleton 470 has a set of joint names corresponding to of joint positions $y_i$, in this exemplary case thirteen, that can subsequently be associated to 3D joints of a 3D virtual character.

In implementations in which image 130 is provided to 2D pose estimation module 108/208 by image augmentation software code 110/210a, receiving 2D pose data 132 may be performed as a local data transfer within system memory 106/206 of computing platform 102/202, as shown in FIG. 1. In those implementations, 2D pose data 132 may be received from 2D pose estimation module 108/208 by image augmentation software code 110/210a, executed by hardware processor 104/204 of computing platform 102/202.

However, in implementations in which image 130 is provided to 2D pose estimation module 108/208 remote from remote computing platform 140/240 by image augmentation software code 210b, 2D pose data 132 may be received via network 120 and network communication links 122/222. As shown in FIG. 1, in those implementations, 2D pose data 132 may be received from remote 2D pose estimation module 108/208 via network 120 by image augmentation software code 210b, executed by hardware processor 244 of remote computing platform 140/240, and using transceiver 252.

Flowchart 360 continues with identifying 3D shape and/or 3D pose 138/238 corresponding to image 130, based on 2D pose data 132, where 3D shape and/or 3D pose 138/238 is identified using an optimization algorithm applied to 2D pose data 132 and one or both of 3D poses library 112/212a/212b and 3D shapes library 114/214a/214b (action 366). It is noted that the description below refers specifically to the identification of a 3D pose 138/238 corresponding to image 130. However and as further discussed briefly below, the present approach may be readily extended for identification of a 3D shape 138/238 corresponding to image 130.

When identifying 3D pose 138/238 corresponding to image 130, it may be advantageous or desirable to include only a relatively small number of 3D poses in 3D poses library 112/212a/212b. For example, in one implementation, 3D poses library 112/212a/212b may include twelve 3D poses. 3D pose 138/238 corresponding to image 130 may be identified by projecting 2D skeleton 470 described by 2D pose data 132 onto the 3D pose space defined by the 3D poses included in 3D poses library 112/212a/212b via local optimization. For example, for each 3D pose in 3D poses library 112/212a/212b, the present solution optimizes for the rigid transformation that will bring the 3D poses in 3D poses library 112/212a/212b closest to the projection of 2D skeleton 470, in terms joint positions and bone direction similarity.

Figure 5:
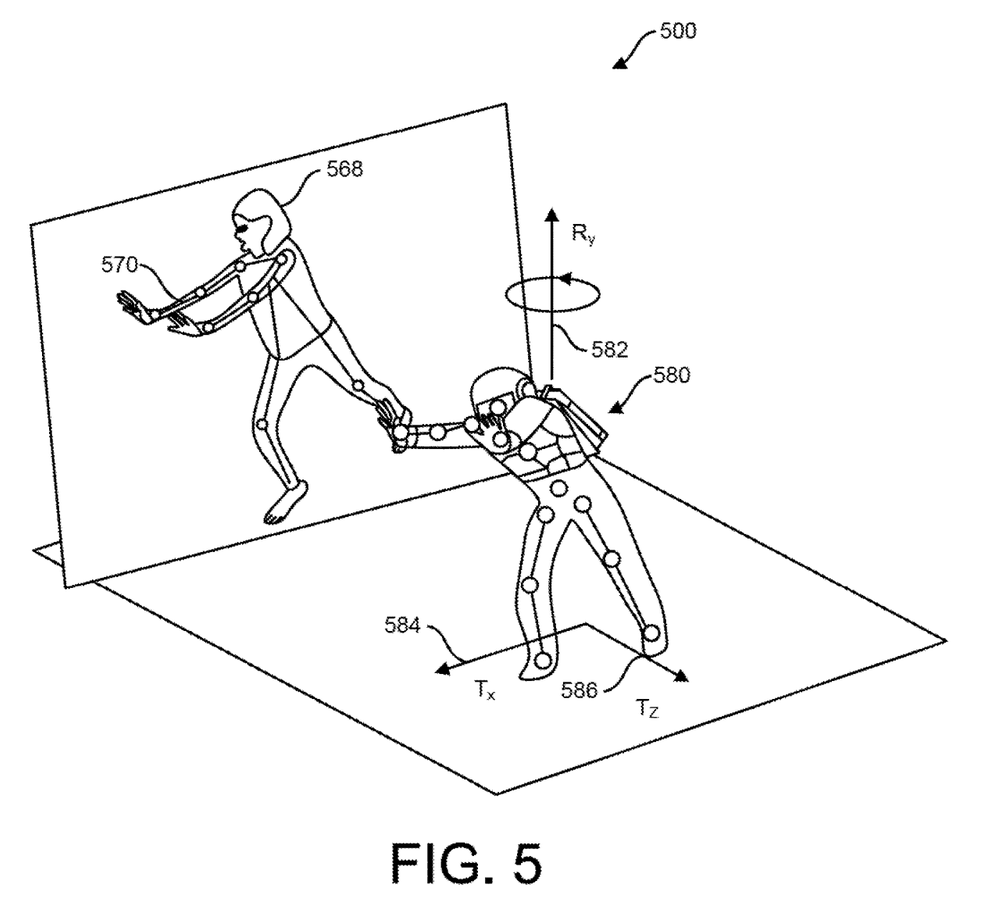
FIG. 5 depicts three-dimensional (3D) pose projection based on a 2D skeleton, according to one implementation.

Referring to FIG. 5, FIG. 5 shows diagram 500 depicting 3D pose projection based on a 2D skeleton, according to one implementation. FIG. 5 shows projection of 2D skeleton 570 and human image 568 included in image 130. FIG. 5 also shows virtual character 580, rotational axis y 582, and mutually orthogonal translational axes x 584 and z 586. It is noted that 2D skeleton 570 corresponds in general to 2D skeleton 470 and may share any of the characteristics attributed to that corresponding feature by the present disclosure.

Formally, for each pose $X^k = \{x_i\}^k$ defined as a set of joint positions $x_i$, we optimize for a reduced rigid transformation M composed of a rotation around the y axis 582 ($R_y$), and translations along the x axis 584 ($T_x$) and z axis 586 ($T_z$) resulting in $M = T_z T_x R_y$. The rigid transformation M minimizes the similarity cost between the 3D projected joint positions P, M, $x_i$, and the 2D joint positions $y_i$, where P is a view and projection transformation of the camera used to obtain image 130. Finally, we analyze all the optimal transformation and pose pairs $\langle X^k, M \rangle$, and identify the one that has the smallest cost value, resulting in the following optimization problem:

$$X^*, M^* = \underset{\langle X^k, M \rangle}{\mathrm{argmin}} \underset{M}{\min} \sum_i \|y_i - PMx_i\|^2 \qquad \text{(Equation 1)}$$

The internal optimization for the transformation M is solved using gradient-based optimization along numerical derivatives. This requires initializing the 3D pose front facing the camera as to ensure convergence towards a sensible solution.

In order to incorporate an apparently 3D virtual character into augmented image 190/290, a view and perspective matrix (P) of the camera used to obtain image 130 is needed. Where image 130 is obtained using camera 254 of remote computing platform 140/240 implemented as part of a mobile communication device, for example, the perspective matrix P is given by the mobile communication device, while a conventional marker-based technology can be utilized to recognize and track the transformations of camera 254. In one implementation, a real world marker that is approximately the size of a person can be included in image 130. When camera 254 obtains image 130, image 130 contains the marker, which may be used to estimate the orientation and position of camera 254.

The 3D pose identified using Equation 1 may be initialized to approximately fit inside the bounding box of the marker. The optimization algorithm adjusts the virtual character's depth translation to substantially match the of 2D skeleton 470/570. If the virtual character is to be smaller, (e.g. a dwarf), final 3D pose 138/238 can be scaled back to its original size at the end of the optimization process.

The description of action 364 provided above refers to identification of 3D pose 138/238 corresponding to image 130. For example, where 3D poses library 112/212a/212b includes twelve 3D poses, an optimization algorithm for solving Equation 1 may be applied to every one of the twelve 3D poses in 3D poses library 112/212a/212b, i.e., the entirety of 3D poses library 112/212a/212b.

By analogy, when action 364 includes identification of 3D shape 138/238 corresponding to image 130, an analogous optimization algorithm can be applied to every combination of every 3D pose in 3D poses library 112/212a/212b with every 3D shape exemplar in 3D shapes library 114/214a/214b. For example, where 3D poses library 112/212a/212b includes twelve 3D poses and 3D shapes library 114/214a/214b includes five 3D shape exemplars, an optimization algorithm for solving an optimization problem analogous to Equation 1 may be applied to each of the sixty combinations (12×5) of the twelve 3D poses and five 3D shape exemplars, i.e., the entirety of 3D poses library 112/212a/212b and 3D shapes library 114/214a/214b.

In implementations in which 2D pose data 132 is received from 2D pose estimation module 108/208 by image augmentation software code 110/210a, identification of 3D shape and/or 3D pose 138/238 may be performed by image augmentation software code 110/210a, executed by hardware processor 104/204 of computing platform 102/202. However, in implementations in which 2D pose data is received from 2D pose estimation module 108/208 by image augmentation software code 210b on remote computing platform 140/240, identification of 3D shape and/or 3D pose 138/238 may be performed by image augmentation software code 210b, executed by hardware processor 244 of remote computing platform 140/240.

In some implementation, the method outlined by flowchart 360 can conclude with action 366 described above. However, in other implementations, flowchart 360 can continue with outputting 3D shape and/or 3D pose 138/238 to render augmented image 190/290 on display 142/242 (action 368). In implementations in which 3D shape and/or 3D pose 138/238 is identified by image augmentation software code 110/210a, image augmentation software code 110/210a may be further executed by hardware processor 104/204 of computing platform 102/202 to output 3D shape and/or 3D pose 138/238 by transmitting 3D shape and/or 3D pose 138/238 to remote computing platform 140/240 via network 120 and network communication links 122/222.

However, in implementations in which 3D shape and/or 3D pose 138/238 is identified by image augmentation software code 210b, image augmentation software code 210b may output 3D shape and/or 3D pose 138/238 as part of augmented image 190/290. In those implementations, for example, hardware processor 244 may execute image augmentation software code 210b to use 3D shape and/or 3D pose to produce augmented image 190/290, and to render augmented image 190/290 on display 142/242. As yet another alternative, in one implementation, image augmentation software code 110/210a of computing platform 102/202 may output 3D shape and/or 3D pose 138/238 as part of augmented image 190/290, and may transmit augmented image 190/290 to remote computing platform 140/240 for rendering on display 142/242.

It is noted that in the various implementations described above, augmented image 190/290 can be rendered on display 142/242 in real-time with respect to receipt of image 130 by image augmentation software code 110/210a or 210b. For example, in some implementations, a time lapse between receiving image 130 by image augmentation software code 110/210a or 210b and rendering augmented image 190/290 on display 142/242 may be less than five seconds, such as two to three seconds.

Figure 6A:
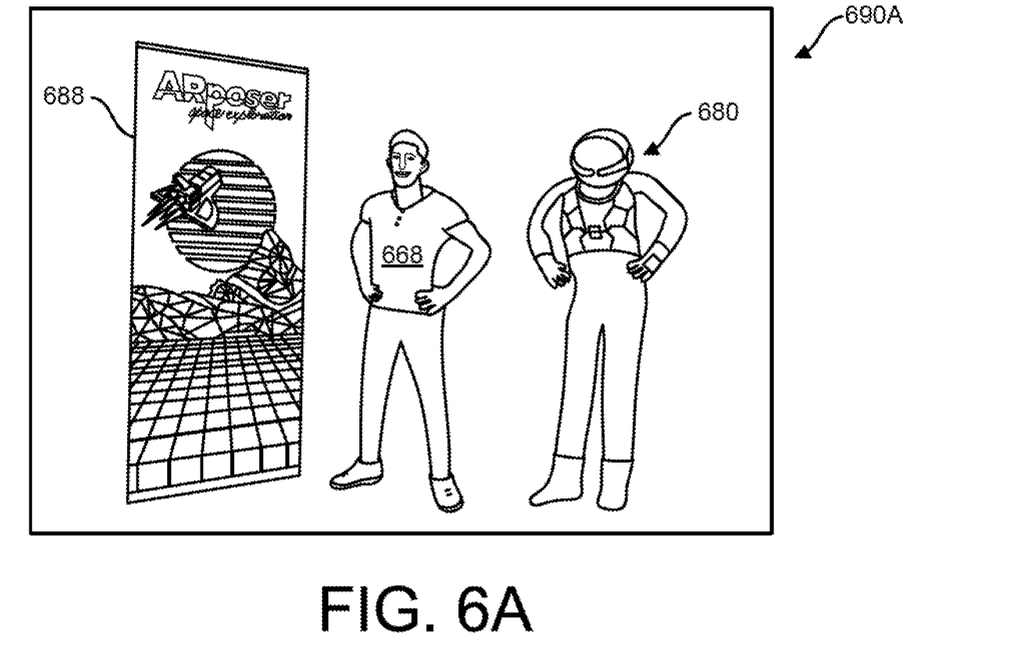
FIGS. 6A and 6B show exemplary augmented images each including a virtual character.
Figure 6B:
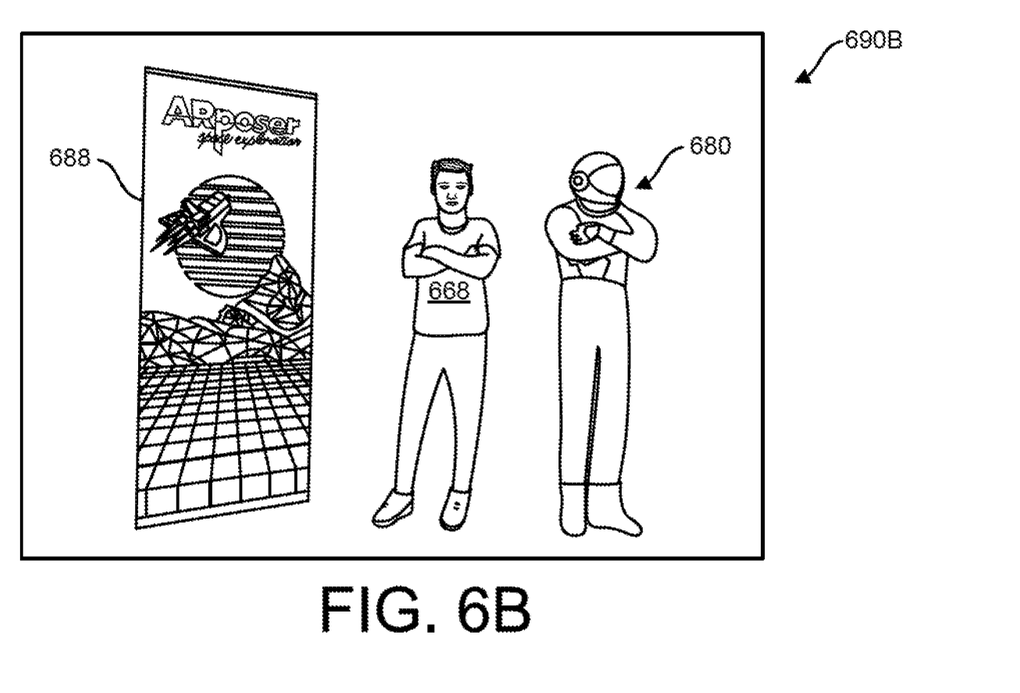

FIG. 6A shows exemplary augmented image 690A including human image 668 and virtual character 680 generated based on 3D shape and/or 3D pose 138/238, according to one implementation, while FIG. 6B shows exemplary augmented image 690B including human image 668 and virtual character 680 generated based on another 3D shape and/or 3D pose 138/238. Also included in FIGS. 6A and 6B is marker 688 that can be utilized to recognize and track the transformations of the camera obtaining image 130 on which augmented image 190/290 is based, as described above by reference to action 364.

It is noted that augmented images 690A and 690B correspond in general to augmented image 190/290, in FIG. 2. Consequently, augmented image 190/290 may share any of the characteristics attributed to augmented images 690A and/or 690B, while augmented images 690A and 690B may share any of the characteristics attributed to augmented image 190/290 by the present disclosure. It is further noted that human image 668 corresponds to human image 568, in FIG. 5, and those corresponding features may share any of the characteristics attributed to either corresponding feature by the present disclosure. Moreover, virtual character 680 corresponds to virtual character 580, and those corresponding features may share any of the characteristics attributed to either corresponding feature by the present disclosure.

As shown in FIGS. 6A and 6B, where image 130 includes human image 568/668, augmented image 190/290/690A/690B includes human image 568/668 and virtual character 580/680 generated based on 3D shape and/or 3D pose 138/238. In some implementations, virtual character 580/680 may be generated based on 3D pose 138/238 alone. In those implementations, and as shown in FIGS. 6A and 6B, virtual character 580/680 and human image 568/668 are typically non-overlapping in augmented image 190/290/690A/690B. For example, and as further shown in FIGS. 6A and 6B, virtual character 580/680 appears in augmented image 190/290/690A/690B beside human image 568/668, and assumes a pose that substantially reproduces the pose of human image 568/668.

However, in implementations in which augmented image 190/290/690A/690B includes human image 568/668 and virtual character 580/680 generated based on 3D shape and 3D pose 138/238, virtual character 580/680 may at least partially overlap human image 568/668. For example, in some implementations, virtual character 580/680 may partially overlap human image 568/668 by appearing to have an arm encircling the shoulders or waist of human image 568/668. In yet another implementation, virtual character 580/680 may substantially overlap and obscure human image 568/668 so as to appear to be worn as a costume or suit by human image 568/668.

In some implementations, the shape of the person corresponding to human image 568/668 can be estimated from a humanoid. That 3D geometry estimation may then be used to support partial occlusions as well as casting approximate shadows from human image 568/668 to virtual character 580/680. Thus, in some implementations, hardware processor 104/204 may further execute image augmentation software code 110/210a to estimate a 3D shape corresponding to human image 568/668 and utilize that 3D shape to generate one or more of a partial occlusion of virtual character 580/680 by human image 568/668 and a shadow or shadows cast from human image 568/668 to virtual character 580/680. Moreover, in other implementations, hardware processor 244 may further execute image augmentation software code 210b to estimate the 3D shape corresponding to human image 568/668 and utilize that 3D shape to generate one or more of the partial occlusion of virtual character 580/680 by human image 568/668 and the shadow(s) cast from human image 568/668 to virtual character 580/680.

FIGS. 7A-7L show exemplary 3D poses 738 and virtual character 780 based on the 3D pose shown in each figure. It is noted that 3D poses 738 correspond in general to 3D shapes and/or 3D poses 138/238, in FIGS. 1 and 2, and those corresponding features may share the characteristics attributed to any of the corresponding features by the present disclosure. In addition, virtual character 780 corresponds in general to virtual character 580/680 in FIGS. 5, 6A, and 6B, and those corresponding features may share the characteristics attributed to any of the corresponding features by the present disclosure.

Figure 7A:
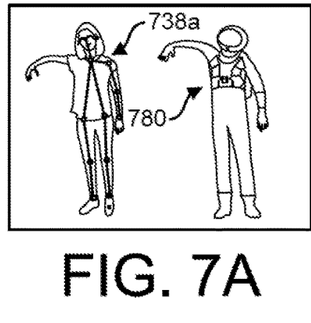
FIGS. 7A-7L show exemplary 3D poses and a virtual character based on the 3D pose shown in each figure.

FIG. 7A shows front facing 3D pose 738a with legs together, left arm lowered at left side, and right arm raised below head with elbow bent. Also shown in FIG. 7A is virtual character 780 assuming substantially the same pose with legs together, left arm lowered at left side, and right arm raised below head with elbow bent.

Figure 7B:
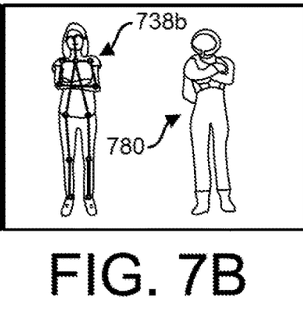

FIG. 7B shows front facing 3D pose 738b with legs together and arms crossed over chest. Also shown in FIG. 7B is virtual character 780 assuming substantially the same pose with legs together and arms crossed over chest.

Figure 7C:
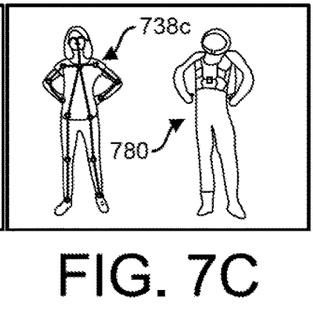

FIG. 7C shows front facing 3D pose 738c with legs slightly spread, elbows bent, and hands on hips. Also shown in FIG. 7B is virtual character 780 assuming substantially the same pose with legs slightly spread, elbows bent, and hands on hips.

Figure 7D:
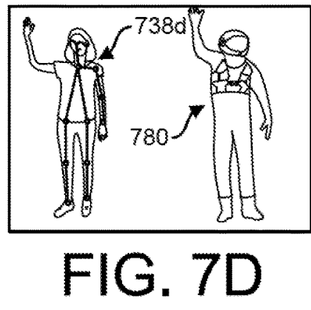

FIG. 7D shows front facing 3D pose 738d with legs together, left arm lowered at left side, and right arm raised above head with elbow bent. Also shown in FIG. 7D is virtual character 780 assuming substantially the same pose with legs together, left arm lowered at left side, and right arm raised above head with elbow bent.

Figure 7E:
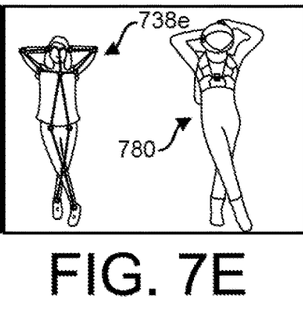

FIG. 7E shows front facing 3D pose 738e with right leg crossed in front of left leg and hands clasped behind head. Also shown in FIG. 7E is virtual character 780 assuming substantially the same pose with right leg crossed in front of left leg and hands clasped behind head.

Figure 7F:
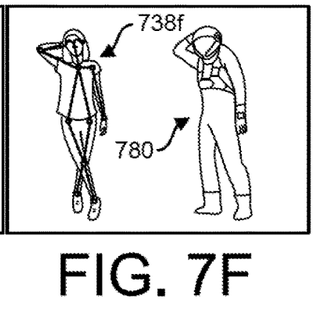

FIG. 7F shows front facing 3D pose 738f with right leg crossed in front of left leg, left arm lowered at left side, and right hand behind head. Also shown in FIG. 7F is virtual character 780 assuming substantially the same pose with right leg crossed in front of left leg, left arm lowered at left side, and right hand behind head.

Figure 7G:
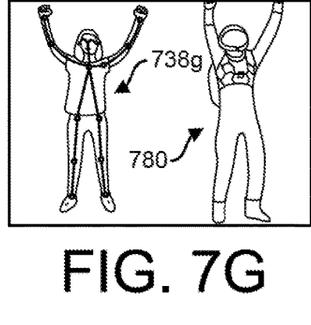

FIG. 7G shows front facing 3D pose 738g with legs slightly spread and both arms raised above head. Also shown in FIG. 7G is virtual character 780 assuming substantially the same pose with legs slightly spread and both arms raised above head.

Figure 7H:
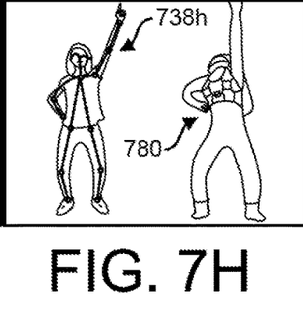

FIG. 7H shows front facing 3D pose 738h with legs slightly spread, knees slightly bent, right hand on right hip, and left arm raised above head. Also shown in FIG. 7H is virtual character 780 assuming substantially the same pose with legs slightly spread, knees slightly bent, right hand on right hip, and left arm raised above head.

Figure 7I:
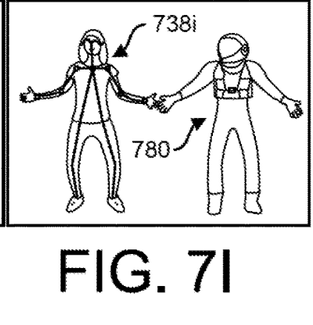

FIG. 7I shows front facing 3D pose 738i with legs slightly spread, knees slightly bent, and arms extended laterally to the sides with elbows bent. Also shown in FIG. 7I is virtual character 780 assuming substantially the same pose with legs slightly spread, knees slightly bent, and arms extended laterally to the sides with elbows bent.

Figure 7J:
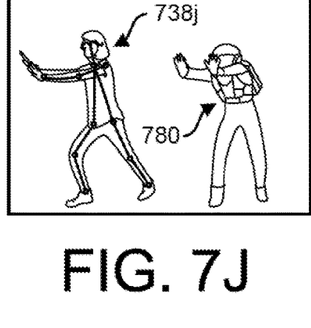

FIG. 7J shows side facing 3D pose 738j with bent right leg lunging forward of left leg and both arms extended forward. Also shown in FIG. 7J is virtual character 780 assuming substantially the same pose with bent right leg stepping forward of left leg and both arms extended forward.

Figure 7K:
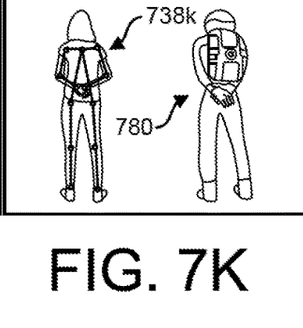

FIG. 7K shows rear facing 3D pose 738k with legs straight and hands clasped at the small of the back. Also shown in FIG. 7K is virtual character 780 assuming substantially the same pose with legs straight and hands clasped at the small of the back.

Figure 7L:
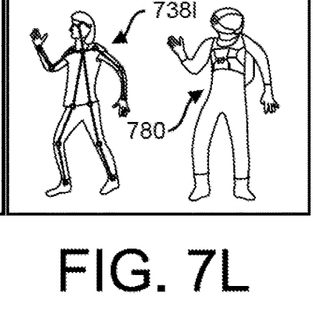

FIG. 7L shows side facing 3D pose 738l with bent right leg stepping forward of left leg, right arm raised with elbow bent, and left arm extended backward with elbow bent. Also shown in FIG. 7L is virtual character 780 assuming substantially the same pose with bent right leg stepping forward of left leg, right arm raised with elbow bent, and left arm extended backward with elbow bent.

It is noted that, in some implementations, 3D poses 738a through 738l may be stored in 3D poses library 112/212a/212b. Moreover, in some implementations, 3D poses 738a through 738l may correspond respectively to substantially all 3D poses stored in 3D poses library 112/212a/212b.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image processing system comprising:
   a computing platform including a hardware processor and a system memory;
   the system memory storing an image augmentation software code, a three-dimensional (3D) poses library including a plurality of poses, and a 3D body shapes library including a plurality of body shapes;
   a two-dimensional (2D) pose estimation software having computing instructions;
   the hardware processor configured to execute the image augmentation software code to:
     obtain an image including a real-world environment image portion corresponding to a real-world environment, a marker image portion corresponding to a marker in the real-world environment, and a human image portion corresponding to a human in the real-world environment;
     provide at least one portion of the image including the human image portion as an input to the 2D pose estimation software;
     receive from the 2D pose estimation software, a 2D pose data generated based on the at least one portion of the image including the human image portion;
     identify a 3D pose and a 3D body shape corresponding to the at least one portion of the image including the human image portion, using the 2D pose data, the plurality of poses in the 3D poses library and the plurality of body shapes in the 3D body shapes library, wherein the 3D pose is initialized to fit inside a bounding box of the marker; and
     generate a virtual character having the identified 3D pose and the identified 3D body shape.

2. The image processing system of claim 1, wherein the hardware processor is further configured to execute the image augmentation software code to:

display, on a display, an augmented reality image including the human and the virtual character within the real-world environment.

3. The image processing system of claim 1, wherein the computing platform is part of a communication device remote from the 2D pose estimation software, the computing platform further comprising a camera, and wherein the hardware processor is further configured to execute the image augmentation software code to obtain the image using the camera.

4. The image processing system of claim 1, wherein the hardware processor is further configured to execute the image augmentation software code to:
display, on a display, an augmented reality image in which the human appears beside the virtual character in the real-world environment, and wherein the virtual character appears as a copy of the human who is wearing a suit or a costume.

5. The image processing system of claim 1, wherein the image is a RGB image.

6. The image processing system of claim 2, wherein a time lapse between receiving the image by the image augmentation software code and displaying the augmented reality image on the display is less than five seconds.

7. The image processing system of claim 2, wherein the hardware processor is further configured to execute the image augmentation software code to:
utilize the 3D body shape to generate a shadow cast from the human to the virtual character in the augmented reality image.

8. The image processing system of claim 2, wherein the virtual character and the human are non-overlapping in the augmented reality image.

9. The image processing system of claim 2, wherein the virtual character at least partially overlaps the human in the augmented reality image.

10. The image processing system of claim 2, wherein the hardware processor is further configured to execute the image augmentation software code to:
utilize the 3D body shape to generate a partial occlusion of the virtual character by the human in the augmented reality image.

11. A method for use by an image processing system including a computing platform having a hardware processor and a system memory storing an image augmentation software code, a three-dimensional (3D) poses library including a plurality of poses, and a 3D body shapes library including a plurality of body shapes, the method comprising:
obtaining, by the image augmentation software code executed by the hardware processor, an image including a real-world environment image portion corresponding to a real-world environment, a marker image portion corresponding to a marker in the real-world environment, and a human image portion corresponding to a human in the real-world environment;
providing, by the image augmentation software code executed by the hardware processor, at least one portion of the image including the human image portion as an input to the 2D pose estimation software;
receiving from the 2D pose estimation software, by the image augmentation software code executed by the hardware processor, a 2D pose data generated based on the at least one portion of the image including the human image portion;
identifying, by the image augmentation software code executed by the hardware processor, a 3D pose and a 3D body shape corresponding to the at least one portion of the image including the human image portion, using the 2D pose data, the plurality of poses in the 3D poses library and the plurality of body shapes in the 3D body shapes library, wherein the 3D pose is initialized to fit inside a bounding box of the marker; and
generating, by the image augmentation software code executed by the hardware processor, a virtual character having the identified 3D pose and the identified 3D body shape.

12. The method of claim 11, further comprising:
displaying, on a display, an augmented reality image including the human and the virtual character within the real-world environment.

13. The method of claim 11, wherein the computing platform is part of a communication device remote from the 2D pose estimation software, the computing platform further comprising a camera, the method further comprising:
obtaining, by the image augmentation software code executed by the hardware processor, the image using the camera.

14. The method of claim 11, further comprising:
displaying, on a display, an augmented reality image in which the human appears beside the virtual character, and wherein, in the augmented reality image, the virtual character appears as a copy of the human who is wearing a suit or a costume.

15. The method of claim 12, wherein a time lapse between receiving the image by the image augmentation software code and displaying the augmented reality image on the display is less than five seconds.

16. The method of claim 12, further comprising:
utilizing the 3D body shape to generate a shadow cast from the human to the virtual character in the augmented reality image.

17. The method of claim 12, wherein the virtual character at least partially overlaps the human in the augmented reality image.

18. The method of claim 12, further comprising:
utilizing the 3D body shape to generate a partial occlusion of the virtual character by the human in the augmented reality image.

19. The image processing system of claim 1, wherein the computing platform further includes a camera configured to obtain the image, and wherein the hardware processor is further configured to execute the image augmentation software code to:
estimate, using the marker image portion of the image, an orientation and a position of the camera.

20. The method of claim 11, wherein the computing platform further includes a camera configured to obtain the image, and wherein the method further comprises:
estimating, using the marker image portion of the image, an orientation and a position of the camera.

* * * * *